United States Patent
Ichinose et al.

(10) Patent No.: US 7,485,980 B2
(45) Date of Patent: Feb. 3, 2009

(54) POWER CONVERTER FOR DOUBLY-FED POWER GENERATOR SYSTEM

(75) Inventors: Masaya Ichinose, Hitachiota (JP); Shinya Oohara, Hitachi (JP); Motoo Futami, Hitachiota (JP); Yasuhiro Imazu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 232 days.

(21) Appl. No.: 11/624,239

(22) Filed: Jan. 18, 2007

(65) Prior Publication Data

US 2007/0210651 A1 Sep. 13, 2007

(30) Foreign Application Priority Data

Mar. 10, 2006 (JP) .............................. 2006-065024

(51) Int. Cl.
*F03D 9/00* (2006.01)
*H02P 9/04* (2006.01)

(52) U.S. Cl. ........................................ 290/44; 290/55

(58) Field of Classification Search .................. 290/44, 290/55
See application file for complete search history.

(56) References Cited

U.S. PATENT DOCUMENTS

| | | | | |
|---|---|---|---|---|
| 3,494,193 A * | 2/1970 | Hans-Jurgen | .............. | 73/304 C |
| 3,564,391 A * | 2/1971 | Dinger | ........................ | 322/25 |
| 3,619,761 A * | 11/1971 | Nagae et al. | .................. | 322/25 |
| 3,634,750 A * | 1/1972 | Bobo | .......................... | 322/20 |
| 3,899,731 A * | 8/1975 | Smith | .......................... | 322/25 |
| 4,219,769 A * | 8/1980 | Macfarlane et al. | ........... | 322/28 |
| 4,262,242 A * | 4/1981 | Glennon | ...................... | 322/28 |
| 4,264,856 A * | 4/1981 | Frierdich et al. | .............. | 322/25 |
| 4,410,848 A * | 10/1983 | Frierdich | ..................... | 322/25 |
| 4,450,398 A * | 5/1984 | Bose | .......................... | 318/803 |
| 4,495,557 A * | 1/1985 | Weit | ............................. | 363/89 |
| 4,559,487 A * | 12/1985 | Sims et al. | .................... | 322/24 |
| 4,567,420 A * | 1/1986 | Beck | .......................... | 318/803 |
| 4,567,422 A * | 1/1986 | Sims | .......................... | 322/25 |
| 4,639,657 A * | 1/1987 | Frierdich | ..................... | 322/59 |
| 4,839,575 A * | 6/1989 | MacFarlane | ................. | 322/25 |
| 5,028,804 A * | 7/1991 | Lauw | ........................ | 290/40 C |
| 5,083,077 A * | 1/1992 | Wallace et al. | ................ | 322/32 |
| 5,239,251 A * | 8/1993 | Lauw | .......................... | 318/767 |
| 5,408,067 A * | 4/1995 | Crouse | .................. | 219/137 PS |

(Continued)

FOREIGN PATENT DOCUMENTS

JP 11-018486 1/1999

*Primary Examiner*—Nicholas Ponomarenko
*Assistant Examiner*—Pedro J Cuevas
(74) *Attorney, Agent, or Firm*—Antonelli, Terry, Stout & Kraus, LLP.

(57) ABSTRACT

An excitation power converter of a doubly-fed generator is protected from excess current to be caused by ground fault or system disturbance and operation continuity of the power converter is ensured. In a power converter system, in order not to flow excess current generated in secondary windings of the doubly-fed generator into the power converter, a rectifier is connected in parallel to the power converter via a reactor, a DC link of the rectifier is connected to a DC link of the power converter, excess current flowing from the secondary windings is separately flowed at a reactor impedance ratio to reduce an amount of current flowing into the power converter, and a semiconductor switching element of an excess current generation arm of the power converter is set to an on-state.

11 Claims, 3 Drawing Sheets

U.S. PATENT DOCUMENTS

| | | | |
|---|---|---|---|
| 5,751,138 A * | 5/1998 | Venkata et al. | 323/207 |
| 5,771,161 A * | 6/1998 | Jackson et al. | 363/40 |
| 5,835,364 A * | 11/1998 | DeWinter et al. | 363/45 |
| 5,886,888 A * | 3/1999 | Akamatsu et al. | 363/65 |
| 5,903,066 A * | 5/1999 | Enjeti et al. | 307/105 |
| 6,919,712 B1 * | 7/2005 | Kitamura et al. | 322/59 |
| 7,227,273 B2 * | 6/2007 | Ahmad et al. | 290/40 C |
| 7,330,012 B2 * | 2/2008 | Ahmad et al. | 318/811 |
| 7,385,372 B2 * | 6/2008 | Ahmad et al. | 318/811 |
| 2006/0001318 A1 * | 1/2006 | Ahmad et al. | 307/10.1 |
| 2006/0001319 A1 * | 1/2006 | Ahmad et al. | 307/10.1 |
| 2006/0001397 A1 * | 1/2006 | Ahmad et al. | 318/801 |
| 2006/0131888 A1 * | 6/2006 | Ahmad et al. | 290/40 C |
| 2007/0030707 A1 * | 2/2007 | Wei et al. | 363/44 |
| 2007/0030708 A1 * | 2/2007 | Wei et al. | 363/44 |
| 2007/0210651 A1 * | 9/2007 | Ichinose et al. | 307/64 |
| 2007/0272904 A1 * | 11/2007 | Johnston et al. | 254/2 R |
| 2008/0103632 A1 * | 5/2008 | Saban et al. | 700/286 |

* cited by examiner

US 7,485,980 B2

POWER CONVERTER FOR DOUBLY-FED POWER GENERATOR SYSTEM

BACKGROUND OF THE INVENTION

1. Field of the Invention

The present invention relates to a secondary winding excitation power converter for suppressing excess current generated in secondary windings of a doubly-fed generator by power system disturbance from flowing into the power converter.

2. Description of the Related Art

A doubly-fed generator (winding type induction generator) used in a power generator system has the following advantages. AC voltage having the same frequency as a system frequency can be output to a stator side by making a power converter excite the rotor windings at a slip frequency, the number of rotations can be made variable, and a capacity of the power converter can be reduced more than that of the generator.

When voltage lowers by ground fault of the power system, the doubly-fed generator operates to supply current to the ground fault point. In this case, excess current is induced in the secondary windings and flows into an excitation power converter connected to the secondary side. In order to resist against excess current, an element capacity of the power converter is set to the same degree as that of the generator ratings or a higher degree, or as disclosed in JP-A-HEI-11-18486 (Paragraphs [0010] to [0012]), excess current is absorbed by short-circuiting the secondary windings with a switching element and a resistor connected to the switching element.

With the conventional method of increasing the capacity of the power converter, however, a system cost increases, degrading the system feature using a doubly-fed generator. With the method of JP-A-HEI-11-18486, after the power converter is stopped once and excess current is removed, the short-circuit is released to activate again the system. Therefore, it takes time to supply power again.

SUMMARY OF THE INVENTION

An object of the present invention is to provide an excitation power converter for a doubly-fed generator capable of protecting the excitation power converter from excess current to be generated by system accident or system disturbance and starting power control immediately after the system accident.

In a power converter system of the present invention, in order not to flow excess current generated in secondary windings of a doubly-fed generator into a power converter, a rectifier is connected in parallel to the power converter via a reactor, a DC link of the rectifier is connected to a DC link of the power converter, excess current flowing from the secondary windings is separately flowed at a reactor impedance ratio to reduce an amount of current flowing into the power converter, and a semiconductor switching element of an excess current generation arm of the power converter is set to an on-state.

According to the power converter system of the present invention, the operation can continue even during system disturbance without stopping the control of the power converter.

Other objects, features and advantages of the invention will become apparent from the following description of the embodiments of the invention taken in conjunction with the accompanying drawings.

DESCRIPTION OF THE EMBODIMENT

In a power converter system of the present invention, an excitation power converter of a doubly-fed generator is protected from system disturbance. In order to realize operation continuity, the reactor impedance of an excess current processing device (rectifier) is lowered and a semiconductor switching element of an excess current generation arm of the power converter is set to an on-state. Details of the present invention will be described with reference to the accompanying drawings.

Figure 1:
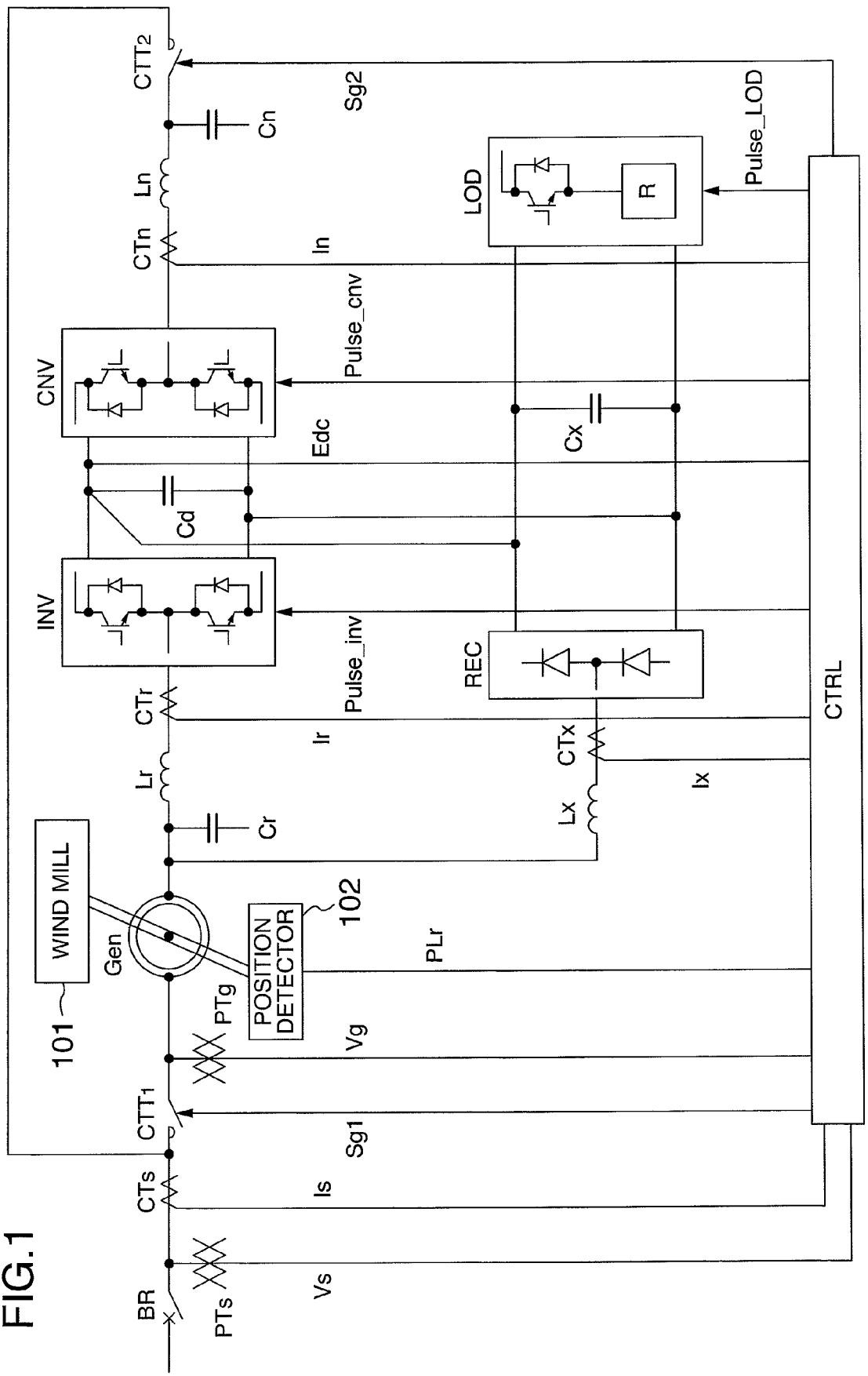
FIG. 1 is an illustrative diagram showing the circuit structure of a wind power generator system according to a first embodiment.

FIG. 1 is a one line diagram showing the configuration of a system according to an embodiment. Although the embodiment will be described by using a wind power generator by way of example, the embodiment is applicable to other usages.

Description will now be made on electric wirings for outputting generated electricity and on the embodiment system. A wind power generator is a doubly-fed generator, and a three-phase output on the side of the rotor of the generator Gen is connected to the secondary side of, e.g., a magnetic contactor CTT1 capable of being opened and closed by an external signal. The primary side of the magnetic contactor CTT1 is connected to the primary side of a magnetic contactor CTT2 and to the secondary side of a breaker BR. The primary side of the breaker BR is connected to a power system.

For example, the breaker BR has a function of opening the breaker upon excess current to shut down the current. When the breaker BR is turned on, power is supplied to a controller of the wind generator system. In this embodiment, a battery apparatus (not shown) such as an uninterruptible power supply is provided to supply power to the controller even during a system accident.

The secondary side of the magnetic contactor CTT2 is connected to AC output terminals of a power converter CNV for interconnection via a capacitor Cn and a reactor Ln. DC output terminals of the power converter CNV are connected to DC output terminals of a power inverter INV for excitation via a DC smoothing capacitor Cd.

The power converter CNV and power inverter INV are each constituted of, e.g., power semiconductor switching elements (GTO, IGBT, POWER MOSFET and the like) and have functions of converting AC into DC and DC into AC, respectively. AC output terminals of the power inverter INV are connected to secondary side winding terminals of the generator Gen via a reactor Lr and a capacitor Cr.

A rectifier REC is connected in parallel to the excitation power converter and connected to the secondary winding side terminals of the generator Gen via a reactor Lx. A DC link of the reactor REC is connected to a DC link of the power converter, and also to an energy consuming load LOD constituted of a semiconductor switch and a resistor. A rotor of the generator Gen is connected to a wind mill 101 for wind electricity generation via gears and the like.

Description will be made on electric wirings for controlling generated electricity and on the embodiment system.

Three-phase voltages and currents on the primary side of the breaker BR are converted into low voltage and current signals Vs and Is by a voltage sensor PTs and a current sensor CTs, respectively. The low voltage and current signals are input to the controller CTRL.

A voltage on the secondary side (across CTT1 and a stator of the generator) of the magnetic contactor CTT1 is converted into a low voltage signal Vg by a voltage sensor PTg, and the low voltage signal is input to the controller CTRL. A three-phase current on the secondary side (between CTT2 and power converter CNV) of the magnetic contactor CTT1 is converted into a low voltage signal In by a current sensor CTn, and the low voltage signal is input to the controller CTRL.

The number of rotations and the position of the rotor of the generator Gen are detected with a position detector 102, e.g., an encoder, and a phase signal PLr (pulse train) is input to the controller CTRL. A voltage across the smoothing capacitor Cd connected to the DC links of the power converter CNV and power inverter INV is converted into a low voltage signal Edc by a voltage sensor, and the low voltage signal Edc is input to the controller CTRL.

Figure 2:
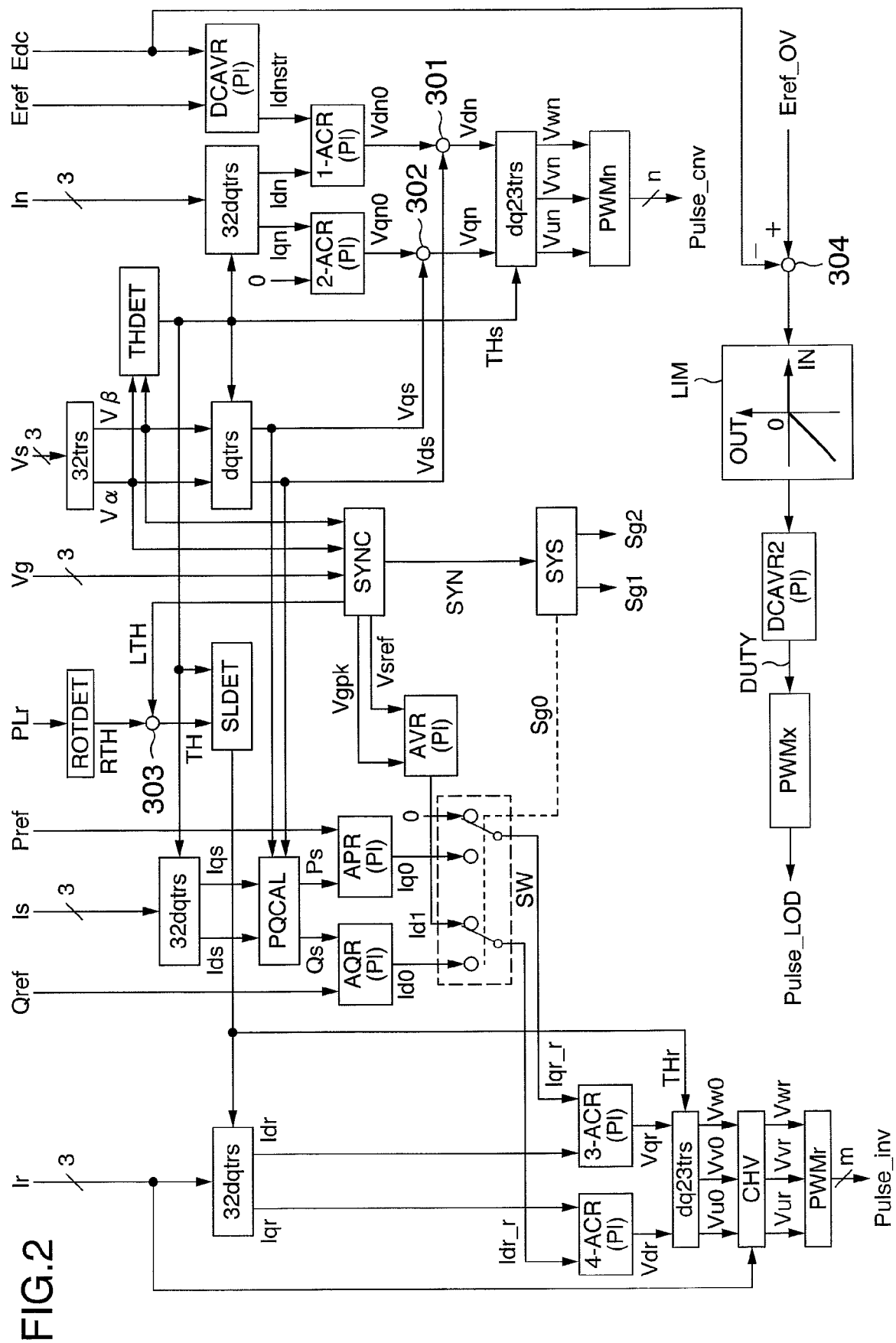
FIG. 2 is an illustrative diagram showing a controller of the wind power generator system of the first embodiment.

Next, the functions of the controller CTRL will be described with reference to FIG. 2. The controller CTR1 controls the magnetic contactors CTT1 and CTT2, power inverter INV, power converter CNV and energy consuming load LOD by using signals Sg1, Sg2, Pulse_inv, Pulse_cnv and Pulse-LOD.

The power converter CNV performs a DC voltage control and a system reactive power null (power factor 1) control for controlling to maintain constant the DC voltage Edc across the smoothing capacitor Cd during operation of the wind generator and while the generator Gen is connected to the power system via the magnetic contactor CTT1. Therefore, as the power inverter INV consumes a DC power and the DC voltage lowers, the power converter CNV receives a power from the power system to charge the smoothing capacitor and maintain constant the DC voltage. Conversely, as the power inverter INV charges the smoothing capacitor Cd and the DC voltage Edc rises, the power converter CNV converts the DC power into the AC power to discharge the smoothing capacitor and maintain constant the DC voltage.

First, control of the power converter CNV will be described in detail. The AC voltage detection value Vs is input to a three-phase/two-phase transformer 32trs. Vα and Vβ output from the three-phase/two-phase transformer 32trs are input to a phase detector THDET. The phase detector THDET calculates a phase signal THs tracing the system voltage, for example, by using a phase locked loop (PLL), and outputs the phase signal to a three-phase/two-phase coordinate transformer 32dqtrs and to a two-phase/three-phase coordinate transformer dq23trs. A DC voltage command value Eref and the DC voltage detection value Edc are input to a DC voltage adjustor DCAVR (e.g., constituted of a proportional integration controller). The DC voltage adjustor DCAVR adjusts a d-axis current command value (active current command value) Idnstr so as to make null a difference between the input command value and detection value, and outputs the d-axis current command value to a current adjustor 1-ACR.

By using a conversion formula (1), the three-phase/two-phase coordinate transformer 32dqtrs calculates from the input current In a d-axis current detection value Idn (active current) and a q-axis current detection value Iqn (reactive current), and outputs the d-axis current detection value Idn to the current adjustor 1-ACR and the q-axis current detection value Iqn to a current adjustor 2-ACR.

$$\begin{pmatrix} Idn \\ Iqn \end{pmatrix} = \begin{pmatrix} \cos(THs) & \sin(THs) \\ -\sin(THs) & \cos(THs) \end{pmatrix} \qquad (1)$$

$$\begin{pmatrix} Iu \cdot \cos(0) + Iv \cdot \cos(2\pi/3) + Iw \cdot \cos(4\pi/3) \\ Iu \cdot \sin(0) + Iv \cdot \sin(2\pi/3) + Iw \cdot \sin(4\pi/3) \end{pmatrix}$$

The current adjustor 1-ACR adjusts a d-axis voltage command value Vdn0 so as to make null a difference between the d-axis current command value Idnstr and d-axis current detection value Idn, and outputs the d-axis voltage command value to an adder 301. Similarly, the current adjustor 2-ACR adjusts a q-axis voltage command value Vqn0 so as to make null a difference between the q-axis current command value Idnstr (0 if a power factor is 1) and q-axis current detection value Iqn, and outputs the q-axis voltage command value to an adder 302. The current adjustors each are constituted of, e.g., a proportional integration controller.

By using the conversion formula (2), the voltage coordinate transformer dqtrs calculates from the input Vα and Vβ which are α and β components of the voltage Vs a d-axis voltage detection value (phase components coincident with the system voltage vector) Vds and a q-axis voltage detection value (components perpendicular to the d-axis voltage detection value) Vqs, and outputs the calculated values to the adders 301 and 302, respectively.

The adder 301 adds together the d-axis voltage command value Vdn0 and d-axis voltage detection value Vds, and outputs an addition result to the two-phase coordinate transformer dq23trs. Similarly, the adder 302 adds together the q-axis voltage command value Vqn0 and q-axis voltage detection value Vqs, and outputs an addition result to the two-phase coordinate transformer dq23trs.

From conversion formulas (3) and (4), the two-phase/three-phase coordinate transformer dq23trs calculates, from the phase signal THs and the addition results Vdn and Vqn by the adders, voltage command values Vun, Wvn and Vwn, and outputs the voltage command values to a PWM calculator PWMn.

$$\begin{pmatrix} Vds \\ Vqs \end{pmatrix} = \begin{pmatrix} \cos(THs) & \sin(THs) \\ -\sin(THs) & \cos(THs) \end{pmatrix} \begin{pmatrix} V\alpha \\ V\beta \end{pmatrix} \qquad (2)$$

$$\begin{pmatrix} Va \\ Vb \end{pmatrix} = \begin{pmatrix} \cos(THs) & -\sin(THs) \\ \sin(THs) & \cos(THs) \end{pmatrix} \begin{pmatrix} Vdn \\ Vqn \end{pmatrix} \qquad (3)$$

$$\begin{pmatrix} Vun \\ Vvn \\ Vwn \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \qquad (4)$$

The PWM calculator PWMn calculates a gate signal Pulse_cnv from the input voltage command values Vun, Vvn and Vwn by pulse width modulation, the pulse signal turning on/off n semiconductor elements constituting the power converter CNV.

Next, control of the power inverter INV will be described. The phase signal PLr representative of the number of rotations and the position of the generator is input to a rotation/phase detector ROTDET. The rotation/phase detector ROTDET counts pulses of the phase signal to convert the count into a phase signal, and outputs to an adder 303 a rotation/phase RTH from 0 to 360° without overflow by resetting the phase signal to 0 by one pulse per one rotation.

The rotation/phase RTH and an output phase signal LTH of a sync controller SYNC are added at the adder 303 to form a phase signal TH. The phase signal TH and the phase signal THs are input to an excitation phase calculator SLDET. The excitation phase calculator SLDET subtracts the phase signal TH from the phase signal THs (THr=THs−TH), multiplies the subtraction result by the number of times corresponding to the number of pole pairs of the generator to thereby output a phase signal THr at an electric angular frequency of the rotor of the generator.

A power calculator PQCAL calculates an active power Ps and a reactive power Qs of the system by using the formula (5) by inputting the d-axis current Ids having the same direction as that of the U-phase vector of the system voltage, the q-axis current Iqs having the direction perpendicular to the U-phase vector of the system voltage, respectively obtained from the system current Is by the conversion formula (1), and by using the d-axis voltage detection value Vds and q-axis voltage detection value Vqs.

$$Ps=3(Vds \times Ids+Vqs \times Iqs)$$

$$Qs=3(-Vds \times Iqs+Vqs \times Ids) \quad (5)$$

An active power adjustor APR receives the active power Ps and an output power command value Pref of the wind power generator, and outputs a torque current command value Iq0 so as to make null a difference between the power command value Pref and active power Ps.

A reactive power adjustor AQR receives the reactive power Qs and an output power command value Qref of the wind power generator, and outputs an excitation current command value Id0 so as to make null a difference between the power command value Qref and reactive power Qs. The active power adjustor APR and reactive power adjustor AQR are each constituted of, e.g., a proportional integration controller.

The current command values Iq0 and Id0 output from the active power adjustor APR and reactive power adjustor AQR are input to a selector SW. The selector SW determines whether outputs from the active power adjustor APR and reactive power adjustor AQR are used or whether 0 is used as the torque current command value and an output from a voltage adjustor AVR is used as the excitation current command value. The selector SW uses the latter (0 for the torque current command value, and an output from the voltage adjustor for the excitation current command value) before the magnetic contactor CTT1 is turned on, i.e., during the voltage sync operation of synchronizing the generator stator voltage with the system voltage, and selects the former (outputs from the power adjustors) after the magnetic contactor CTT1 is turned on.

The voltage adjustor AVR will be described. The voltage adjustor AVR receives as a feedback value an amplitude value Vgpk of the generator stator voltage Vg, and as a command value Vsref obtained by filtering an amplitude value of the system voltage Vs, and outputs to the selector SW the excitation current command value Id1 so as to make null a difference between the amplitude value of the generator stator voltage Vg and the command value. The voltage adjustor AVR is constituted of, e.g., a proportional integration controller. The voltage adjustor AVR operates in the close state of the magnetic contactor CTT1, and calculates the excitation current command value of an excitation current to be flowed from the power inverter INV to the secondary side of the generator Gen.

By using a conversion formula (6), a three-phase/two-phase coordinate transformer 32dqtrs calculates from an input current Ir and rotor phase THr a d-axis current detection value Idr (excitation current components) and a q-axis current detection value Iqr (torque current components), and outputs the d-axis current detection value Idr to a current adjustor 4-ACR and the q-axis current detection value Iqr to a current adjustor 3-ACR.

$$\begin{pmatrix} Idr \\ Iqr \end{pmatrix} = \begin{pmatrix} \cos(THr) & \sin(THr) \\ -\sin(THr) & \cos(THr) \end{pmatrix} \quad (6)$$

$$\begin{pmatrix} Iu \cdot \cos(0) + Iv \cdot \cos(2\pi/3) + Iw \cdot \cos(4\pi/3) \\ Iu \cdot \sin(0) + Iv \cdot \sin(2\pi/3) + Iw \cdot \sin(4\pi/3) \end{pmatrix}$$

The current adjustor 4-ACR outputs a d-axis voltage command value Vdr so as to make null a difference between the d-axis current command value Id1 or Id0 and the d-axis current detection value Idr. Similarly, the current adjustor 3-ACR outputs a q-axis voltage command Vqr so as to make null a difference between the q-axis current command value Iq1 or Iq0 and the q-axis current detection value Iqr. The current adjustor is constituted of, e.g., a proportional integration controller.

The d-axis voltage command value Vdr and q-axis voltage command value Vqr are input to a two-phase/three-phase coordinate transformer dq23trs which calculates voltage command values Vu0, Vv0 and Vw0 from the phase signal THr and each input, by using conversion formulas (7) and (8).

$$\begin{pmatrix} Va \\ Vb \end{pmatrix} = \begin{pmatrix} \cos(THr) & -\sin(THr) \\ \sin(THr) & \cos(THr) \end{pmatrix} \begin{pmatrix} Vdr \\ Vqr \end{pmatrix} \quad (7)$$

$$\begin{pmatrix} Vu0 \\ Vv0 \\ Vw0 \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad (8)$$

The calculated Vu0, Vv0 and Vw0 are input to an excess current suppressing controller CHV which in turn outputs to a PWM calculator PWMr voltage command values Vur, Vvr and Vwr changed in accordance with the excess currents.

The PWM calculator PWMr calculates a gate signal Pulse_inv from the input voltage command values Vur, Vvr and Vwr by pulse width modulation, the pulse signal turning on/off m semiconductor elements constituting the power inverter INV.

The sync controller SYNC has two functions: a function of calculating a voltage command value for making the amplitude value of the stator voltage be coincident with the amplitude value of the system voltage; and a function of calculating the output phase signal LTH for making the phase of the stator voltage before connection to the system be coincident with the phase of the system voltage.

The first function, amplitude sync, will first be described. In order to synchronize voltage amplitudes, an amplitude value Vspk of the system voltage is calculated from a root of a sum of squares of Vα and Vβ, and ripple components of the calculated amplitude value are removed by a first order lag filter or the like to be used as the voltage command value Vsref of the voltage adjustor. Similarly, the stator voltage Vgpk is calculated from α and β components to be used as the feedback value Vgpk of the voltage adjustor and also for amplitude sync judgement. In amplitude sync judgement, the voltage command value Vsref is compared with the voltage amplitude Vgpk, and if a difference is in a predetermined range, it is judged that the amplitudes are synchronized.

Next, the second function, phase sync, will be described. The phase sync function calculates a phase difference in order to make the system voltage phase be coincident with the stator voltage phase. If this phase difference is output as the output phase signal LTH, the phase of the generator stator voltage changes abruptly. Therefore, the phase difference is input to an integrator having a limiter, and an output of the integrator is used as the output phase signal LTH. The output phase signal is added to or subtracted from the rotation phase RTH to obtain a rotation phase TH.

The excitation phase THr is obtained by subtracting the rotation phase TH from the system voltage phase THs, as described earlier, and the frequency of phase THr is called generally "slip". Therefore, as the power inverter INV conducts excitation at the phase of the phase signal THr, the stator angular frequency $\omega 1$ becomes coincident with the angular frequency $\omega 0$ of the system voltage ($\omega 0 = \omega 1$), and the phases are also made coincident by the output phase signal LTH.

When the voltages and phases become coincident, the sync controller SYNC sends a sync signal SYN to a system controller SYS.

Upon reception of the sync signal SYN, the system controller SYS outputs signals Sg0 and Sg1 which operate the selector SW and magnetic contactor CTT1, respectively.

As the phase difference becomes generally coincident and the sync signal SYN is output, the system controller SYS sends the control switching signal Sg0 to the selector SW, and outputs a close command to the magnetic contactor CTT1.

Next, description will be made on the rectifier REC when system disturbance occurs. As the system voltage lowers, current increases by $\Delta I$ because of a voltage difference $\Delta V$ between an induction voltage and the system voltage. In this case, current in the secondary winding increases by $\Delta I/a$ where a is a winding ratio of the doubly-fed generator. If this current $\Delta I/a$ is large, excess current flows in the secondary winding.

Since the voltage converter and rectifier are connected to the secondary side via the reactors Lr and Lx, current Ir flowing in the reactor Lr and current Ix flowing in the reactor Lx are given by formulas (9) and (10), respectively, and separated at an impedance ratio between the reactors Lr and Lx.

Excess current by disturbance is caused by DC components and opposite phase components of accident current flowing in the primary side (stator), and AC current appears on the winding side. Therefore, reactors can be used to give an impedance difference between the power converter and rectifier on the secondary side.

$$Ir = (\Delta I/a) \times Lx/(Lr+Lx) \quad (9)$$

$$Ix = (\Delta I/a) \times Lr/(Lr+Lx) \quad (10)$$

Figure 3:
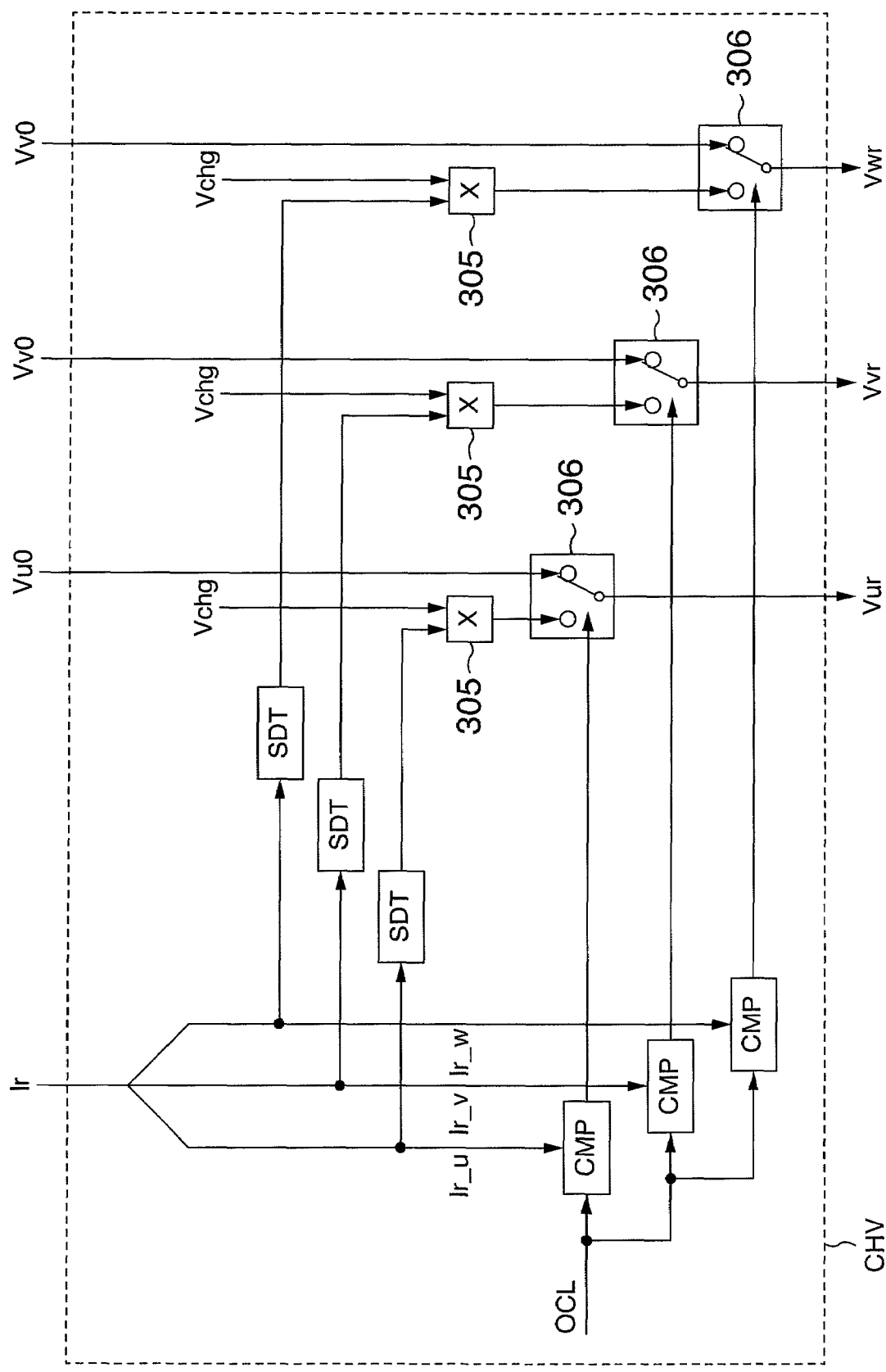
FIG. 3 is an illustrative diagram showing an excess current suppressing controller CHV of the first embodiment.

FIG. 3 shows the structure of the excess current suppressing controller CHV illustrating a control method of separating accident current flowing in the generator rotor upon a system accident into the rectifier REC to avoid excess current in the power inverter INV.

If voltage causing excess current generation is large and voltage output from the power inverter INV is insufficient, there is a case where excess current does not flow separately into the rectifier REC. In order to avoid this, the excess current suppressing controller CHV is provided.

Inverter current Ir detected with the current sensor CTr is input to the excess current suppressing controller CHV. In the excess current suppressing controller CHV, the inverter current Ir and an excess current detection level OCL are compared by a comparator CMP. A direction of current flowing into the power inverter INV is defined as when the current detection value is positive. When current is positive and excess current is detected, the voltage command value of the phase at which excess current is generated is changed to an excess current suppressing command value Vchg, a current sign is extracted by a sign extractor SDT, the excess current suppressing command value is multiplied by the current sign by a multiplier 305, and this multiplied value is used as a voltage command value Vur (or Vvr or Vwr) of the power inverter INV. In this manner, an upper side element of an arm of the power inverter INV at which excess current is generated is turned on. The excess current suppressing value Vchg is larger than a PWM modulation signal. If the excess current suppressing value multiplied by the sign is positive, the upper arm turns on, whereas if it is negative, the upper arm turns off. The "arm" means semiconductor elements connected across the DC link of the power inverter INV, and the "upper arm" means a semiconductor element or a semiconductor element group connected to the DC positive potential side as viewed from the AC terminal.

Conversely, when current is negative and excess current is detected, the voltage command value of the phase at which excess current is generated is changed to an excess current suppressing command value Vchg, and the excess current suppressing command value multiplied by the current sign by the multiplier 305 is used as the voltage command value Vur (or Vvr or Vwr) of the power inverter INV. In this manner, a lower side element of an arm of the power inverter INV at which excess current is generated is turned on. A lower element of the arm of the power inverter INV at which excess current is generated is turned on.

In FIG. 3, if current Ir_u of a phase U (affix "_u" means the phase U) becomes larger than the excess current detection level, which means generation of excess current on the phase U arm, then the phase U voltage command value is made larger than the PWM modulation signal to generate an upper side element on-signal. In this case, the input voltage command values are used at other phases.

With the excess current suppressing controller CHV, a potential of the excess current phase is fixed to the direction suppressing excess current, and current at the phase of the power inverter INV is separately flowed into the rectifier. A current separation ratio is determined by the formulas (9) and (10), and excess current in the power inverter INV can be suppressed.

In the above description, in order to fix the potential at the excess current phase to the potential suppressing excess current, a semiconductor element of an arm at which excess current is generated is turned on during excess current generation. Instead, semiconductor elements of upper and lower arms at an excess current phase may be turned off only during excess current generation.

Current separated in this manner charges the smoothing capacitor Cd and capacitor Cx at the DC link and raises DC voltage. As the DC voltage rises, elements and capacitors constituting the rectifier and power converter and inverter are dielectrically broken. Therefore, when DC voltage exceeds a predetermined value, e.g., 110% of the normal case, the energy consuming load LOD is activated.

A difference between a second DC voltage command value Eref_OV and the detection value Edc is detected by a subtractor 304 in order to activate the energy consuming load LOD and control DC voltage to be at a predetermined value or lower.

An output of the subtractor is input to a limiter LIM. If the difference is negative, i.e., if the DC voltage is larger than the command value, the limiter outputs the difference. If the difference is positive, i.e., if the DC voltage is smaller than the command value, the limiter outputs "0". An output of the limiter is input to a DC voltage adjustor DCAVR2.

The DC voltage adjustor DCAVR2 calculates a command value DUTY for turning on and off the switching element to operate the energy consuming load only while the DC voltage is larger than the command value, and outputs to the energy consuming load LOD the pulse command value Pulse_LOD for turning on and off the switching element in accordance with the command value DUTY.

The energy consuming load is constituted of, e.g., a power semiconductor switching element and a resistor (or reactor) serially connected to the switching element, and operates to consume DC voltage power while the power semiconductor switching element turns on. By operating the energy consuming load in this way, the DC voltage can be maintained at the predetermined value or lower.

As described so far, the rectifier is connected to the rotor by changing the value of the reactor, the DC link of the rectifier is connected to the DC link of the power inverter and converter, and the excess current suppressing controller CHV is provided for changing the voltage command value of the excess current phase of the power inverter INV. Accordingly, it is possible to flow excess current from the rotor separately into the power inverter INV and rectifier at the impedance ratio and reduce the current flowing into the power inverter and converter. It is therefore possible to reduce the current capacity of the power inverter and converter.

Further, since excess current in the power inverter and converter can be suppressed, the operation of the power inverter and converter can continue without stopping the gate signal to the power inverter and converter. The energy consuming load is connected to the DC side of the rectifier and operated when DC voltage rises due to excessive current, so that the apparatus can be protected from excess DC voltage. Since the arrangement of the parallel rectifier is introduced, an additional rectifier can be provided to a system desired to continue the operation during excess current generation due to system accident and to a system desired to output power fast after the operation start. If an additional rectifier is not necessary, the additional rectifier is not provided. The operation can be determined flexibly in this manner.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A generator in which a stator side of a doubly-fed generator is connected to a power system and an excitation power converter is connected to secondary windings of said doubly-fed generator to adjust generation of a power to be output from said doubly-fed generator to said power system, wherein:
   said excitation power converter is connected to the secondary windings of said doubly-fed generator via a first impedance;
   a diode rectifier is connected in parallel to the second windings of said doubly-fed generator via a second impedance; and
   a DC link of said diode rectifier is connected in parallel to a DC link of said excitation power converter,
   wherein the generator comprises a controller for outputting an on-command to a power semiconductor switching element of said excitation power converter if a value of current flowing in the power semiconductor switching element is a predetermined value or larger.

2. The generator according to claim 1, wherein said first and second impedances are reactors.

3. The generator according to claim 1, wherein a value of said first impedance is larger than a value of said second impedance.

4. The generator according to claim 1, wherein an energy consuming load is connected to the DC link of said diode rectifier.

5. The generator according to claim 1, wherein said controller is provided with an excess current suppressing controller receives said predetermined value and a value of current flowing into said power semiconductor switching elements and output the on-command.

6. A generator in which a stator side of a doubly-fed generator is connected to a power system and an excitation power converter is connected to secondary windings of said doubly-fed generator to adjust generation of a power to be output from said doubly-fed generator to said power system, wherein:
   said excitation power converter comprises a first power converter whose AC terminal side is connected to said second windings via a first impedance and whose DC terminal side is connected to a smoothing capacitor, and a second power converter whose DV terminal side is connected to said smoothing capacitor and whose AC terminal side is connected to the power system;
   a diode rectifier is connected in parallel to the second windings of said doubly-fed generator via a second impedance; and
   a DC link of said diode rectifier is connected in parallel to a DC link of said excitation power converter,
   wherein the generator comprises a controller for outputting an on-command to a power semiconductor switching element of said excitation power converter if a value of current flowing in the power semiconductor switching element is a predetermined value or larger.

7. The generator according to claim 6, wherein said first and second impedances are reactors.

8. The generator according to claim 6, wherein a value of said first impedance is larger than a value of said second impedance.

9. The generator according to claim 6, wherein an energy consuming load is connected to the DC ling of said diode rectifier.

10. The generator according to claim 6, wherein said controller is provided with an excess current suppressing controller receives said predetermined value and a value of current flowing into said power semiconductor switching elements and output the on-command.

11. A generator in which a stator side of a doubly-fed generator is connected to a power system and an excitation power converter is connected to secondary windings of said doubly-fed generator to adjust generation of a power to be output from said doubly-fed generator to said power system, wherein:
   said excitation power converter is rotated by a wind mill;
   said excitation power converter comprises a first power converter whose AC terminal side is connected to said second windings via a first impedance and whose DC terminal side is connected to a smoothing capacitor, and a second power converter whose DC terminal side is connected to said smoothing capacitor and whose AC terminal side is connected to the power system;
a diode rectifier is connected in parallel to the second windings of said doubly-fed generator via a second impedance; and
a DC link of said diode rectifier is connected in parallel to a DC link of said excitation power converter,
wherein the generator comprises a controller for outputting an on-command to an IGBT of said excitation power converter if a value of current flowing in the IGBT is a predetermined value or larger.

* * * * *